Patented Feb. 4, 1947

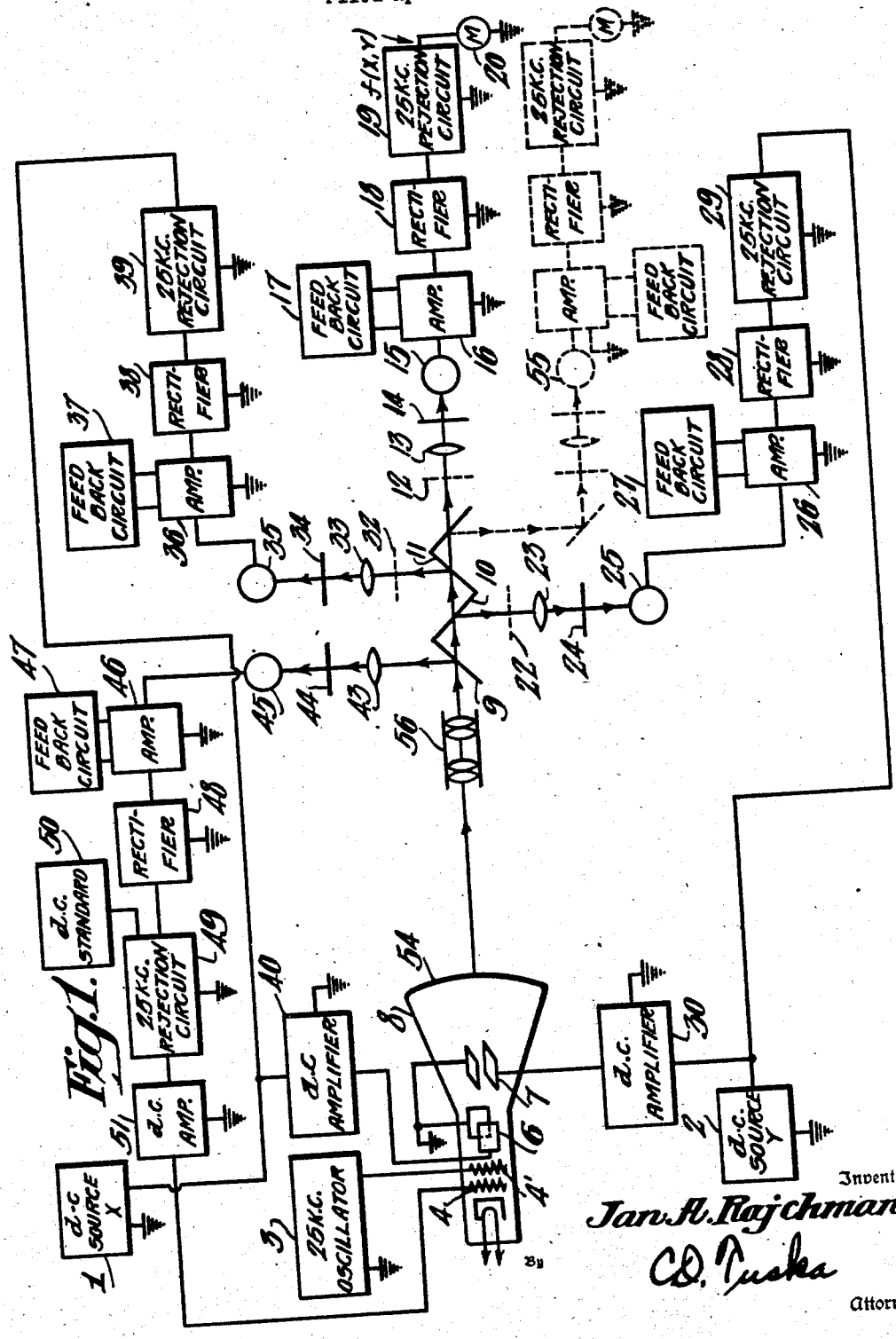

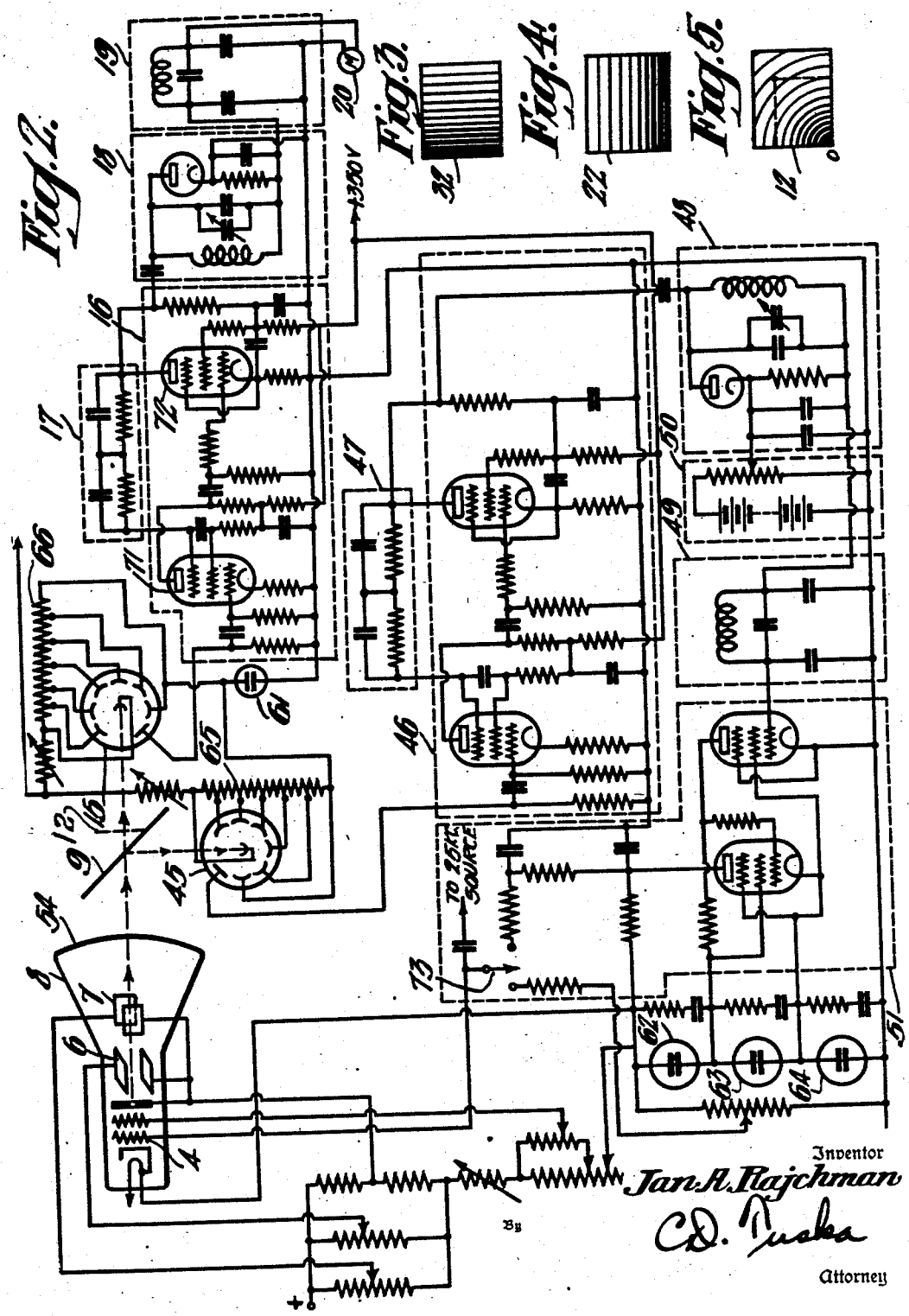

2,415,191

UNITED STATES PATENT OFFICE 2,415,191

ELECTRONIC COMPUTER

Jan A. Rajchman, Philadelphia, Pa., assignor to Radio Corporation of America, a corporation of Delaware Application April 30, 1942, Serial No. 441,170

8 Claims. (Cl. 235—61)

This invention relates generally to computing devices and particularly to electronic computers in which a function of two variables is continuously indicated in terms of an electric current or voltage.

Heretofore, various electronic computers have been known which utilized moving mechanical parts for light scanning either predetermined fiducial marks or apertures formed by adjustable mechanical elements. This invention is a modification of the method and apparatus described by applicant in his copending application, Serial No. 441,169, filed April 30, 1942. Both of these applications contemplate the elimination of all moving mechanical elements in the computer per se, and utilize the substantially inertialess movement of a cathode ray beam for scanning in any desired manner a screen of predetermined variable density. It will be clear that the accuracy of the device is determined principally by the linearity with which the cathode ray beam may be deflected in response to deflecting voltages which are a function of the variables under consideration, and the accuracy of the predetermined variation of the screen density.

An object of the invention is to provide an improved method of and means for computing electronically a predetermined function of two variables. Another object is to provide an improved method of and means for computing electronically, without the use of moving mechanical elements, a function of two variables expressed in terms of voltages applied to a cathode ray tube, to derive an electric current proportional in amplitude to the desired function. Another object of the invention is to provide an improved method of and means for continuously deriving electronically a current which is a predetermined function of two variables applied to the computer in terms of voltages proportional to the instantaneous value of each variable. Still another object is to provide an improved method of and means for correcting errors in such an electronic computer caused by non-linearity of the component electronic elements.

This invention differs from applicant's above mentioned copending application in that instead of scanning predetermined fiducial marks on transparent screens, the present method comprises deflecting the light image of a cathode ray across screens of variable density to derive from suitable light responsive devices voltages proportional to the light intensity transmitted through the screens.

The invention will be described by reference to the drawings, of which Fig. 1 is a schematic diagram of a preferred embodiment of the invention; Fig. 2 is a schematic circuit diagram of the principal electrical circuits; and Figs. 3, 4 and 5 are elevational views of the variable density screens which are components of the system of Fig. 1.

Referring to Fig. 1, the horizontal deflection elements 6 of the cathode ray oscillograph tube 8 are supplied with deflecting voltages from a first variable D.-C. source 1, the output voltage of which is proportional to the value of the first variable X. The vertical deflection elements 7 of the cathode ray oscillograph tube 8 are supplied with deflecting voltages from a second D.-C. source 2, the output voltage of which is proportional to the value of the second variable Y. The variable D.-C. voltages in the sources 1 and 2 may be obtained from a battery and potentiometer, the sliding contact of which is actuated by the device under observation, or in any other well known manner. It will be apparent that the cathode ray in the oscillograph tube 8 will be deflected predetermined distances along the vertical and horizontal axes which are substantially proportional to the values of the variables Y and X, respectively. The cathode ray beam will, in a well known manner, produce an illuminated spot on the fluorescent screen 54 of the cathode ray tube 8. The light spot on the fluorescent screen 54 is focused by the lens system 56 on a half-silvered mirror 9, disposed at an angle of approximately 45 degrees to the optical axis of the lens 56. A second half-silvered mirror 10 is disposed on the same axis normal to the first mirror 9, and a third half-silvered mirror 11 is located on the axis normal to the second mirror 10. A portion of the light image from the fluorescent screen 54 is transmitted through all three mirrors and applied to the variable density screen 12 (see Fig. 5), the density of which varies in a predetermined manner, with the radius from the point 0 which corresponds to the position of the light beam when the variables X and Y are both of zero value. The light transmitted by the screen 12 is focused by the lens 13 upon the diffusion screen 14. A light responsive device 15, which may be an electron multiplier of the RCA type 931, located in light responsive relation with respect to the diffusion screen 14, generates a voltage proportional to the received light intensity. This voltage is amplified by the conventional amplifier 16 having a feedback stabilization circuit 17 described hereinafter. The output of the amplifier 16 is applied to the rectifier 18, the D.-C. output of which is passed by the 25 kc. rejection filter 19 to a suitably calibrated indicator 20. Readings on the indicator 20 are proportional to the desired function of X and Y. In order to overcome errors caused by the dark currents in the photosensitive electron amplifier 15, the cathode ray is modulated by applying the output of a 25 kc. oscillator 3 to one of the cathode ray oscillograph control grids 4. Readings on the indicator 20 are proportional to the amplitude of the 25 kc. voltages in the circuit and independent of the D.-C. component in the electron multiplier output.

The low intensity of the spot produced on the fluorescent screen 54 is normally subject to considerable variation due to non-uniformity of the fluorescent screen, internal charging effects, and the angle of incidence of the light beam with the lens 56. A portion of the light applied to the first half-silvered mirror 9 is reflected to the lens 43 and focused upon the diffusion screen 44. A second light sensitive electron multiplier 45, which may also be of the RCA type 931, located in light responsive relation with respect to the diffusion screen 44, produces a voltage which is substantially proportional to the light transmitted by the lens system 56. This voltage is applied to the input of a conventional amplifier 46 including a feedback stabilization circuit 47. The output of the amplifier 46 is applied to the rectifier 48. The D.-C. voltage thus derived is subtracted from a D.-C. standard voltage 50, which may be a battery source, and is applied to the input of a second D.-C. amplifier 51 through the 25 kc. rejection filter 49. The output of the D.-C. amplifier 51 is connected to the control grid 4 of the cathode ray oscillograph tube 8 to apply potentials which correct for variations in the light intensity of the spot on the fluorescent screen 54.

The arrangement described has been found to stabilize the light intensity transmitted by the lens system 56, to one part in 50 for a moving light spot and to one part in 100 for a stationary light spot.

In order to correct for non-linearity in the deflection of the cathode ray beam with respect to the deflecting voltages applied to the horizontal and vertical deflection elements, a portion of the light applied to the second half-silvered mirror 10 is reflected to the variable density screen 22, the density of which varies linearly in a vertical direction, and a portion of the light applied to the half-silvered mirror 11 is reflected to the variable density screen 32, the density of which varies linearly in a horizontal direction. The details of these screens are illustrated in Figs. 3 and 4. The light transmitted by the screen 22 is focused by the lens 23 on a diffusion screen 24. A photosensitive electron multiplier which may be of the RCA 931 type, located in light responsive relation with respect to the screen 24, generates voltage proportional to the intensity of the light transmitted by the screen 22. This voltage is applied to the input of a conventional amplifier 26 which includes a feedback stabilizing circuit 27 described hereinafter. The output of the amplifier 26 is applied to the rectifier 28. The output of the rectifier 28 is applied, through the 25 kc. rejection filter 29, to the input of the conventional D.-C. amplifier 30, where it is subtracted from the voltage derived from the D.-C. source 2. The output of the amplifier 30 is connected to the vertical deflection elements 7. It will be apparent that the vertical deflection of the cathode ray beam will produce a voltage which varies proportionally to the intensity of the light beam transmitted by the variable density screen 22. Therefore, D.-C. voltages derived from the output of the filter circuit 29 may be applied to the vertical deflection D.-C. amplifier 30 to correct for non-linearity in vertical deflection.

Similarly, the light transmitted by the variable density screen 32 is focused by the lens 33 upon the diffusion screen 34. Voltages derived from the light sensitive electron multiplier 35, located in light responsive relation with respect to the diffusion screen 34, are applied to the input of the conventional amplifier 36 which includes a feedback stabilization circuit 37. The output of the D.-C. amplifier 36 is applied to the input of the rectifier 38. The output of the rectifier 38 is connected through the 25 kc. rejection filter 29 to the horizontal deflection D.-C. amplifier 40 and subtracted from the voltage derived from the D.-C. source 1, to correct for non-linearity in horizontal deflection. The output of the D.-C. amplifier 40 is connected to the horizontal deflection elements 6.

Figure 2 includes the cathode ray oscillograph tube 8, the light responsive device 15, the amplifier 16 with stabilization circuit 17, the rectifier 18 and the 25 kc. rejection filter 19 for deriving currents for actuation of the indicator 20. The light responsive device 45, the amplifier 46 with its stabilization circuit 47, the rectifier 48, the source of standard voltage 50, the 25 kilocycle rejection filter 49 and the D.-C. amplifier 51 are connected to the electron beam control grid 4 to compensate for variations in the intensity of the light beam emitted from the fluorescent screen 54 of the cathode ray tube 8. The light responsive devices and circuits for compensating for non-linearity in the vertical and horizontal deflection of the cathode ray beam are omitted for the sake of simplicity since they correspond in all respects to the circuit described for the indication of the desired function of the two variables X and Y.

The light responsive electron multiplier 15 is supplied with suitable positive potentials from selected points on the voltage divider 66. The voltage regulator 61 which may be of the RCA VR-150, or similar, type is provided for stabilizing the potentials in this circuit. The output of the light responsive device 15 contains both D.-C. and 25 kc. components. The 25 kc. component is applied to the input of the first amplifier tube 71, the output of which is coupled through a conventional resistance-capacity network to the input of the second amplifier tube 72. A stabilization feedback circuit 17 comprising a resistance-capacity network couples the anode of the second amplifier tube 72 to one of the grid electrodes of the first amplifier tube 71. The amplified 25 kilocycle signal derived from the second amplifier tube 72 is applied to a rectifier circuit 18. The D.-C. component of the demodulated signal is passed by the 25 kc. rejection filter 19 and applied to the indicator 20 which is calibrated in terms of the desired function of X and Y.

A portion of the light impinging on the half-silvered mirror 9 is reflected to the light sensitive electron multiplier 45. The multiplier is supplied with suitable operating voltages from selected points on the voltage divider 65. The 25 kilocycle component of the multiplier output is amplified in the 2 stage amplifier circuit 46, stabilized by the feedback circuit 47, and demodulated by the rectifier 48 in the same manner as described heretofore for the circuits 16, 17 and 18. The D.-C. output component of the rectifier 48 is subtracted from a standard D.-C. voltage source 50, which may include a battery and potentiometer, and applied to the input of the 2 stage D.-C. amplifier circuit 51 through the 25 kilocycle rejection filter 49. The D.-C. output signal of the amplifier 51 is further stabilized by the conventional voltage regulator tubes 62, 63 and 64 which may be of the RCA VR–150, or similar, type The output of the amplifier 51, or the stabilized output derived from the voltage regulator circuit, is selected by the switch 73, and applied with the 25 kc. modulating signal, to the control grid 4 of the cathode ray oscillograph tube 8, to compensate for variations in the intensity of the luminous spot on the fluorescent screen 54. Suitable voltage dividers may, if desired, be provided for biasing the beam deflection to adjust for desired zero values of the variables X and Y.

If a plurality of different functions of the variables X and Y are to be indicated simultaneously, the light transmitted by the third half-silvered mirror 11 (see Fig. 1) may be divided into as many light responsive electron multipliers as desired. This light may illuminate filters, the density of which vary, in any desired manner, from a common point representing the zero value of the variables. The output of the additional multipliers, one of which 55 is shown by dash lines in Figure 1, with its associated circuits, are applied to suitably calibrated indicators.

Figure 3 indicates the variation in density of the screen 32 for correction of non-linearity in horizontal deflection of the electron beam. Figure 4 indicates the variation in density of the screen 22 for correction of non-linearity in vertical deflection of the electron beam. Figure 5 illustrates the variation in density of the screen 12 which transmits the portion of the light beam from which is derived the desired function of the variables X and Y. If the variation in density is linear radially from the point 0 the indicated function will be a diagonal of a rectangle formed by the variables X and Y. By suitably varying the density gradation, other desired functions may be readily obtained.

The screens should be prepared by etching or photographic means to, as accurately as possible, provide the desired density gradation. One well-known method of preparing such screens is to photographically reduce to the desired size a large drawing or half-tone picture.

I claim as my invention:

1. An electronic computer for deriving a predetermined function of two independent variables including a cathode ray tube having ray generating means, ray deflecting means and a fluorescent screen in the path of said ray, means for determining the horizontal deflection of said ray by the instantaneous value of one of said variables, means for determining the vertical deflection of said ray by the instantaneous value of the other of said variables, a second screen of variable density, means for forming an image of said fluorescent screen on said second screen, means for deriving voltages proportional to the intensity of the light transmitted by said second screen, and means for indicating the amplitude of said voltages.

2. Apparatus of the type described in claim 1 including means for maintaining substantially constant the average light intensity applied to said second screen.

3. Apparatus of the type described in claim 1 including means for compensating for non-linearity in the deflection of said ray with respect to the voltages representing said variables.

4. Apparatus of the type described in claim 1 including means for diverting a portion of the light from said fluorescent screen, means for deriving from said diverted light voltages proportional to the vertical and horizontal components of said ray deflection, and means for utilizing said voltages to compensate for non-linearity in the deflection of said ray.

5. Apparatus of the type described in claim 1 including means for diverting a portion of the light from said fluorescent screen, means for deriving from said diverted light voltages proportional to the intensity of said light, and means for utilizing said voltages to compensate for variations in the intensity of said light.

6. Apparatus of the type described in claim 1 including means for diverting a portion of the light from said fluorescent screen, means for deriving from said diverted light voltages proportional to the intensity of said light, means including a light responsive device and at least one variable density screen for deriving from said diverted light voltages proportional to non-linearity in the vertical and horizontal components of said ray deflection, and means for utilizing said voltages to compensate for said variations in the deflection of said ray.

7. Apparatus of the type described in claim 1 including means for diverting a portion of the light from said fluorescent screen, means for deriving from said diverted light voltages proportional to the intensity of said light, means including a light responsive device and a source of standard voltage for deriving from said diverted light voltages proportional to variations in the intensity of said light, and means for utilizing said voltages to compensate for variations in said light intensity.

8. Apparatus of the type described in claim 1 including means for modulating the intensity of said cathode ray for deriving a control potential for maintaining substantially constant the average light intensity derived from said fluorescent screen.

JAN A. RAJCHMAN.